(12) United States Patent
Yamamoto et al.

(10) Patent No.: US 11,186,211 B2
(45) Date of Patent: Nov. 30, 2021

(54) ARMREST

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

(72) Inventors: Satoshi Yamamoto, Mie (JP); Makoto Higashikozono, Mie (JP); Kaho Hayashi, Mie (JP); Hideki Oshima, Aichi (JP); Takahiko Endo, Gifu (JP); Keiji Makino, Gifu (JP); Jun Jin, Gifu (JP); Takemasa Okumura, Gifu (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

( * ) Notice: Subject to any disclaimer, the term of this patent is extended or adjusted under 35 U.S.C. 154(b) by 0 days.

(21) Appl. No.: 16/967,029

(22) PCT Filed: Jan. 24, 2019

(86) PCT No.: PCT/JP2019/002191
§ 371 (c)(1),
(2) Date: Aug. 3, 2020

(87) PCT Pub. No.: WO2019/155892
PCT Pub. Date: Aug. 15, 2019

(65) Prior Publication Data
US 2021/0031660 A1    Feb. 4, 2021

(30) Foreign Application Priority Data
Feb. 9, 2018   (JP) .............................. JP2018-022260

(51) Int. Cl.
*B60N 2/75*    (2018.01)
*A47C 7/54*    (2006.01)

(52) U.S. Cl.
CPC ................ *B60N 2/797* (2018.02); *A47C 7/54* (2013.01)

(58) Field of Classification Search
CPC .............. B60N 2/797; B60N 3/00; A47C 7/54
(Continued)

(56) References Cited

U.S. PATENT DOCUMENTS 2,599,079 A * 6/1952 Tatom .................. B60N 2/2209
                                                    188/67
2,863,494 A * 12/1958 Lautier .............. B64D 11/0626
                                                    297/362.12
(Continued)

FOREIGN PATENT DOCUMENTS

| JP | 53-35313  | 8/1978 |
| JP | 55-043539 | 3/1980 |

(Continued)

OTHER PUBLICATIONS

Official Communication issued in International Patent Application No. PCT/JP2019/002191, dated Apr. 9, 2019, along withan English translation thereof.

*Primary Examiner* — Rodney B White
(74) *Attorney, Agent, or Firm* — Greenblum & Bernstein, P.L.C.

(57) ABSTRACT

An armrest includes a cable to be connected to a seat-side cable arranged on a seat, and a body member that is
(Continued)

mountable on the seat and includes a routing section therein in which the cable is arranged. The cable includes an arranged portion that is arranged in the routing section and a connecting operation section that extends outside the routing section when being connected to the seat-side cable. The connecting operation section is arranged in the routing section when the body member is mounted on the seat.

6 Claims, 8 Drawing Sheets

(58) Field of Classification Search
USPC .............. 297/217.3, 217.4, 411.32, 411.38
See application file for complete search history.

(56) References Cited

U.S. PATENT DOCUMENTS

| | | | | |
|---|---|---|---|---|
| 3,730,019 | A * | 5/1973 | Ballard | F16C 1/18 74/502 |
| 3,880,466 | A | 4/1975 | Brennan | |
| 4,494,793 | A * | 1/1985 | Rogers, Jr. | A47C 1/034 297/269.1 |
| 4,588,226 | A * | 5/1986 | Young | A47C 3/18 297/344.24 |
| 4,671,572 | A * | 6/1987 | Young | A47C 3/18 248/425 |
| 4,828,323 | A * | 5/1989 | Brodersen | B60N 2/77 297/411.36 |
| 4,856,762 | A * | 8/1989 | Selzer | F16F 9/0209 267/64.12 |
| 4,881,424 | A * | 11/1989 | Clark | B60T 7/10 297/411.38 X |
| 4,887,864 | A * | 12/1989 | Ashton | B60N 2/23 297/375 |
| 4,948,541 | A * | 8/1990 | Beck | B60N 2/797 264/46.7 |
| 5,083,912 | A * | 1/1992 | Beck | B29C 44/1266 425/117 |
| 5,174,526 | A * | 12/1992 | Kanigowski | B60N 2/6671 244/118.5 |
| 5,197,780 | A * | 3/1993 | Coughlin | A47C 7/465 192/48.91 |
| 5,612,718 | A * | 3/1997 | Bryan | H01H 13/84 297/411.38 X |
| 5,613,733 | A * | 3/1997 | Miller, Sr. | B60N 2/0224 297/344.1 |
| 5,671,972 | A * | 9/1997 | Tedesco | A47C 1/0244 297/362.13 |
| 5,813,726 | A * | 9/1998 | Husted | B60N 2/4214 248/429 |
| 6,155,640 | A * | 12/2000 | Severini | B60N 2/0705 248/429 |
| 6,698,835 | B2 * | 3/2004 | Kojima | B60N 2/0881 248/429 |
| 6,902,238 | B1 * | 6/2005 | Abt | B60N 2/0228 297/362.13 |
| 7,001,561 | B2 * | 2/2006 | Nix | B29C 45/14598 264/254 |
| 7,172,250 | B2 * | 2/2007 | Wu | A47C 1/023 297/337 |
| 7,303,236 | B2 * | 12/2007 | Ritter | B60N 2/075 248/429 |
| 7,866,751 | B2 * | 1/2011 | Downey | B60N 2/06 297/344.24 |
| 8,282,150 | B2 * | 10/2012 | Clor | B60N 2/305 296/65.09 |
| 8,408,630 | B2 * | 4/2013 | Saito | B60N 2/2245 296/65.13 |
| 8,534,761 | B2 * | 9/2013 | Saxton | B60N 2/753 297/411.32 |
| 8,876,213 | B2 * | 11/2014 | Tame | B60N 2/767 297/411.38 |
| 9,592,756 | B1 * | 3/2017 | Hansen | B60N 2/12 |
| 9,981,571 | B2 * | 5/2018 | Garing | B60N 2/231 |
| 10,220,949 | B2 * | 3/2019 | Thomaschewski | B60N 2/797 |
| 10,279,917 | B1 * | 5/2019 | Wilkey | B60N 2/797 |
| 10,604,048 | B2 * | 3/2020 | Vela | B60N 2/797 |
| 10,675,996 | B2 * | 6/2020 | Hoyer | B60N 2/20 |
| 10,696,191 | B2 * | 6/2020 | Does | B60N 2/20 |
| 10,829,223 | B2 * | 11/2020 | Senneff | F16C 1/12 |
| 10,836,494 | B2 * | 11/2020 | Wilkey | B64D 11/0644 |
| 10,894,495 | B2 * | 1/2021 | Davies | B60N 2/76 |
| 10,940,949 | B2 * | 3/2021 | Hoover | B60N 2/0296 |
| 2002/0069753 | A1 * | 6/2002 | Lauderbach | F16F 9/0263 92/137 |
| 2004/0021349 | A1 * | 2/2004 | Longtin | B64D 11/0646 297/217.3 |
| 2004/0217642 | A1 * | 11/2004 | Herault | B64D 11/06 297/411.32 |
| 2005/0275271 | A1 * | 12/2005 | Magnuson | B60N 2/79 297/411.38 |
| 2006/0103212 | A1 * | 5/2006 | Waligora | B60N 2/233 297/362.14 |
| 2007/0029855 | A1 * | 2/2007 | Ritter | B63B 29/06 297/344.22 |
| 2011/0148166 | A1 * | 6/2011 | Bruck | B60N 2/206 297/411.32 X |
| 2011/0260972 | A1 | 10/2011 | Huang | |
| 2014/0191553 | A1 * | 7/2014 | Blendea | B60N 2/20 297/354.1 |
| 2015/0274038 | A1 | 10/2015 | Garing | |
| 2017/0015422 | A1 * | 1/2017 | Garing | B60N 2/995 |
| 2017/0050734 | A1 * | 2/2017 | Becker | B64D 11/064 |
| 2018/0056837 | A1 * | 3/2018 | Lee | H02J 7/0045 |
| 2019/0364391 | A1 * | 11/2019 | Yamaguchi | G01S 5/14 |

FOREIGN PATENT DOCUMENTS

| | | |
|---|---|---|
| JP | 5-001480 | 1/1993 |
| JP | 2006-095104 | 4/2006 |
| JP | 3168102 | 6/2011 |
| JP | 2013-220781 | 10/2013 |
| JP | 2014-058230 | 4/2014 |

* cited by examiner

ARMREST

TECHNICAL FIELD

The technology disclosed herein relates to an armrest that is to be mounted on a seat.

BACKGROUND ART

An armrest described in Patent Document 1 has been known as an armrest that is to be mounted on a seat of a vehicle. The armrest includes a skin, a frame arranged inside the skin, and foamed resin material with which the inside of the skin is filled.

RELATED ART DOCUMENT

Patent Document

[Patent Document 1] Japanese Unexamined Patent Application Publication No. 2006-95104

SUMMARY OF THE INVENTION

Problem to be Solved by the Invention

According to the spread of portable devices such as mobile phones, smartphones, and tablet terminals, the connection between the portable device and the vehicle has been demanded for charging the portable device with power of the vehicle or connecting the portable device to an audio device of the vehicle to play music data stored in the portable device.

The connection structure between the portable device and the vehicle is preferably mounted near a vehicle occupant's hand since the portable device is operated with the vehicle occupant's hand. A cable connected to the vehicle may be routed within the armrest that is mounted on the seat. However, a specific technology for routing the cable within the armrest is not achieved yet.

Means for Solving the Problem

The technology disclosed herein is an armrest that includes a cable to be connected to a seat-side cable arranged on a seat and a body member that is mountable on the seat and includes a routing section therein in which the cable is arranged. The cable includes an arranged portion that is arranged in the routing section and a connecting operation section that extends outside the routing section when being connected to the seat-side cable and the connecting operation section is arranged in the routing section when the body member is mounted on the seat.

According to such a configuration, the connecting operation section extending outside the routing section is electrically connected to the seat-side cable and this improves operability. When the body member is mounted on the seat, the connecting operation section is arranged in the routing section and can be protected from an external force.

Embodiments of the technology described herein may preferably include configurations as follows.

(1) The connecting operation section may further include a connector to be connected to the seat-side cable. The routing section may include a connector arrangement section in which the connector can be arranged when the body member is mounted on the seat.

According to such a configuration, in the body member that is mounted on the seat, the connector is arranged in the connector arrangement section and can be protected from an external force.

(2) The arranged portion may include an extra length portion having a length corresponding to the connecting operation section and the routing section may include a cable storing section in which the extra length portion is arranged when the body member is mounted on the seat.

In putting the connecting operation section in the routing section, the arranged portion includes the length corresponding to the connecting operation section as the extra length portion and the arranged portion is pushed into the routing section and the connecting operation section may not be stored in the routing section. According to the above configuration, the extra length portion is stored in the cable storing section when the connecting operation section is arranged in the routing section. Therefore, the extra length portion does not disturb the operation and the connecting operation section can be stored in the routing section smoothly.

(3) The body member may include an insertion hole through which the connecting operation section is inserted and a fixing member that can close the insertion hole when the body member is mounted on the seat. The fixing member may include a mount portion that is fixed to a portion of an exposed cable section including the connecting operation section and the seat-side cable and the portion may be closer to the seat than the connecting operation section is.

According to such a configuration, the fixing member is fixed to the portion of the exposed cable section that is closer to the seat with respect to the connecting operation section. Therefore, the length of the connecting operation section that is arranged in the routing section can be changed by changing the portion to which the fixing member is fixed.

Advantageous Effects of Invention

According to the armrest of the technology disclosed herein, an extra length portion that is necessary when mounting the armrest on a seat can be surely included in a cable and the extra length portion can be arranged in the armrest and protected after the mounting.

MODES FOR CARRYING OUT THE INVENTION

First Embodiment

A first embodiment will be described with reference to FIGS. 1 to 8.

A whole structure of an armrest AR in this embodiment will be described.

Figure 1:
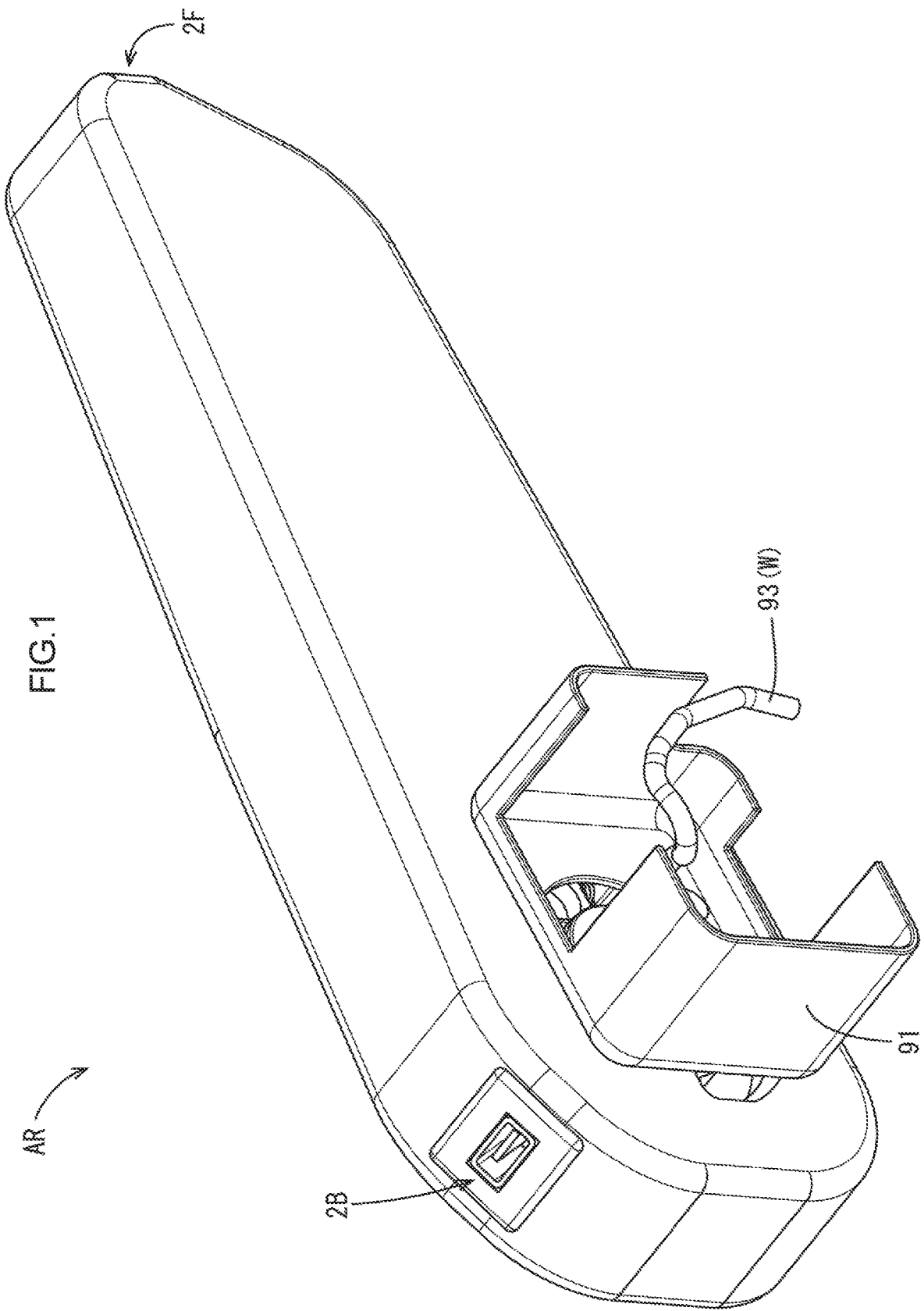
FIG. 1 is a perspective view illustrating an armrest in an embodiment that is mounted on a seat-side bracket and seen from a rear side.
Figure 2:
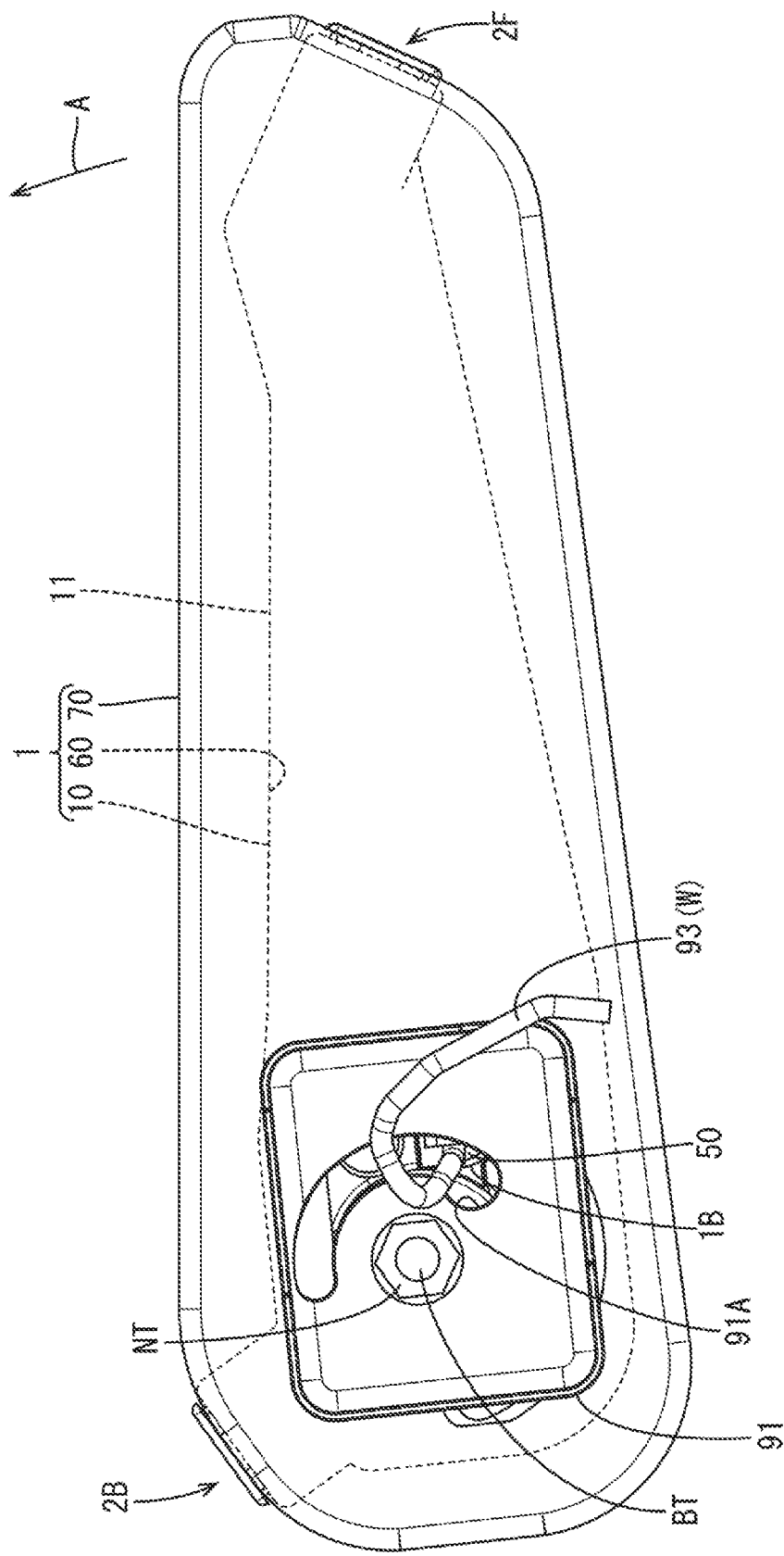
FIG. 2 is an inner surface side view illustrating the armrest that is mounted on the seat-side bracket.
Figure 3:
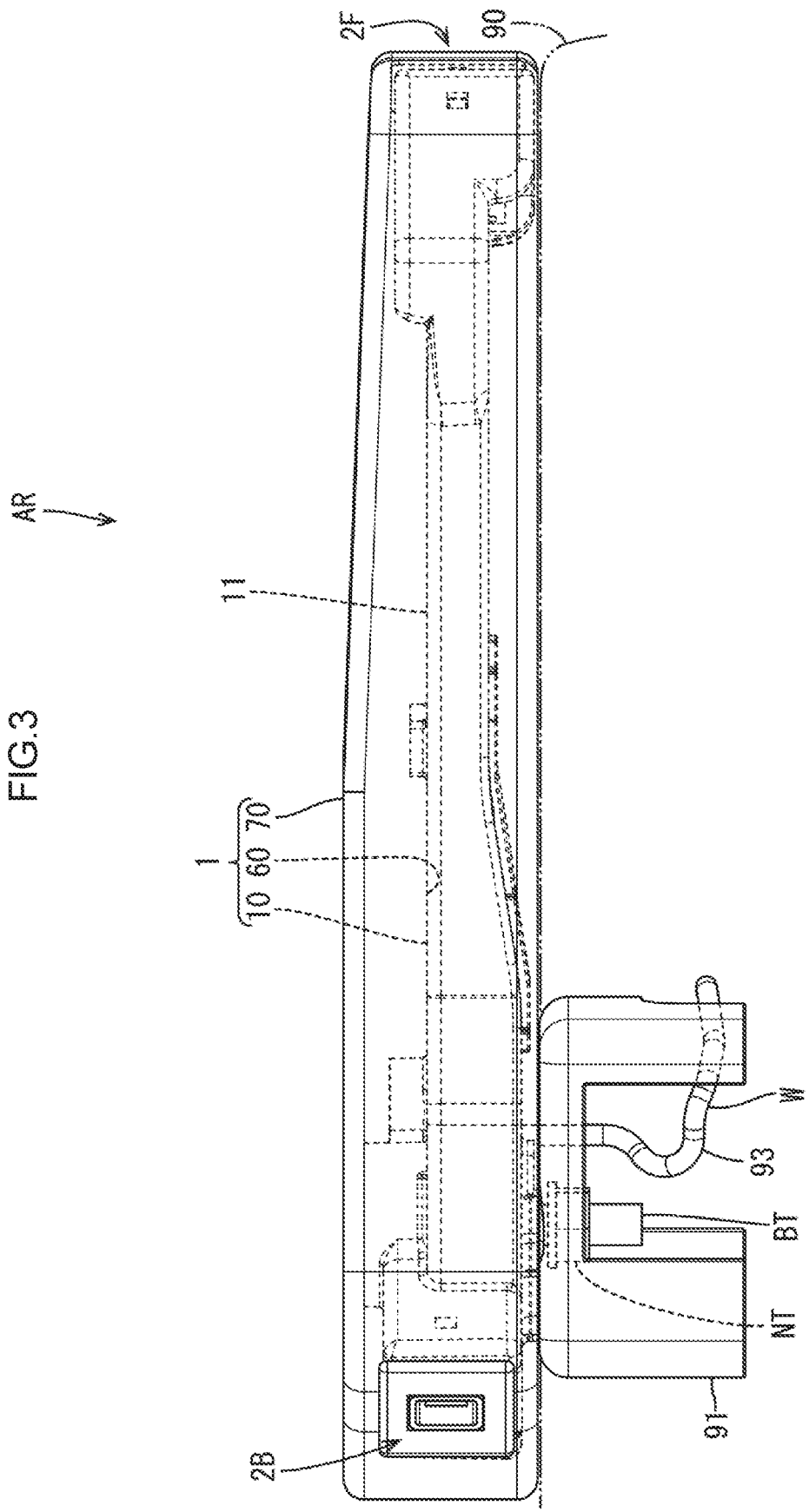
FIG. 3 is an upper view illustrating an inner structure of a body member.

The armrest AR in the present embodiment is movably mounted on a seat 90 of a vehicle as illustrated in FIG. 3. The armrest AR includes USB (universal serial bus) ports 2F, 2B that are used as a power and a data communication circuit for a portable device such as a mobile phone, a smartphone, and a tablet terminal. As illustrated in FIG. 1, the armrest AR includes a body member 1 that has a certain thickness in a left-right direction and tapered toward a front side. As illustrated in FIG. 2, the body member 1 includes the USB ports 2F, 2B in a front end portion and a rear end portion thereof, respectively. As illustrated in FIG. 3, a shaft portion of a bolt BT protrudes from one side surface (a front side on the sheet of FIG. 2) of the body member 1. A bracket 91, which is a component of a seat, is fixed to the shaft portion of the bolt BT and fastened with a nut NT. Accordingly, the body member 1 can pivotably move upward with respect to the bracket 91 as illustrated with an arrow A in FIG. 2. Hereinafter, the shaft portion of the bolt BT protrudes from an inner surface side of the body member 1 and a surface side opposite from the inner surface side is an outer surface side.

As illustrated in FIG. 2, the bracket 91 includes a through hole 91A having an arched shape around the shaft portion of the bolt BT. The body member 1 includes an insertion hole 1B so as to be seen through the through hole 91A of the bracket 91. A cable 40 is inserted through the insertion hole 1B. A seat-side cable 93 is inserted into the body member 1 through the through hole 91A and the insertion hole 1B and is an USB cable W that extends to the USB ports 2F, 2B.

Next, insertion of the USB cable W in the body member 1 will be described. As specifically illustrated in FIGS. 2 and 3, the body member 1 in the present embodiment includes a frame 10 that is covered with a skin 70, and a space between the frame 10 and the skin 70 is filled with a filling material to form a foamed resin section 60. Thus, the body member 1 has an integrally formed three-layered structure. Therefore, the sheet-side cable 93 cannot extend into the body member 1.

Figure 6:
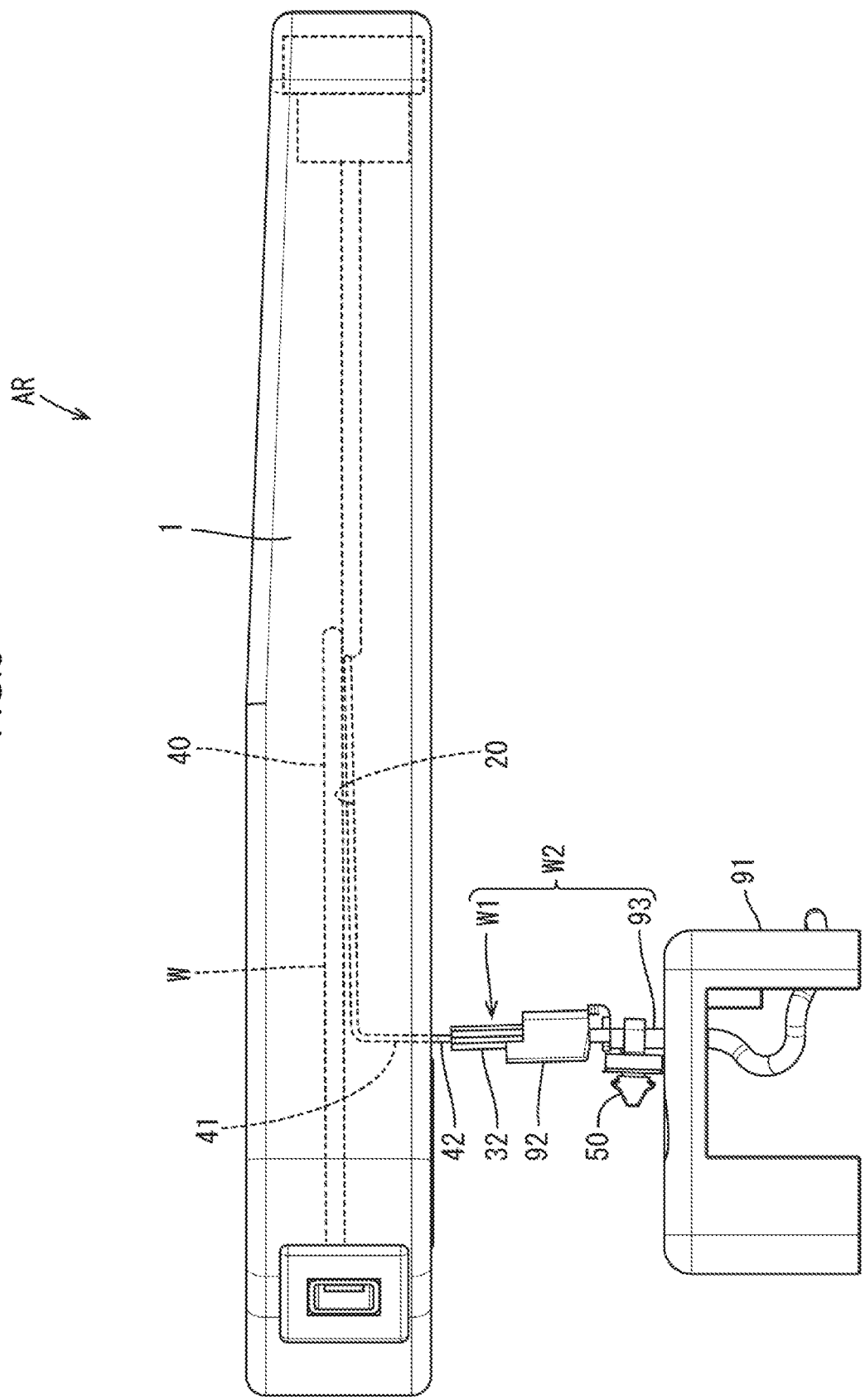
FIG. 6 is an inner surface side view illustrating the armrest before the extra length portion is arranged inside the body member.

In the armrest AR in the present embodiment, as illustrated in FIG. 6, when producing the body member 1, the cable 40 that is different from the seat-side cable 93 is arranged in the body member 1 such that an end of the cable 40 extends outside the body member 1. The end is connected to the seat-side cable 93 when the armrest is mounted on the seat 90. The USB cable W is configured with the seat-side cable 93 and the cable 40.

Figure 4:
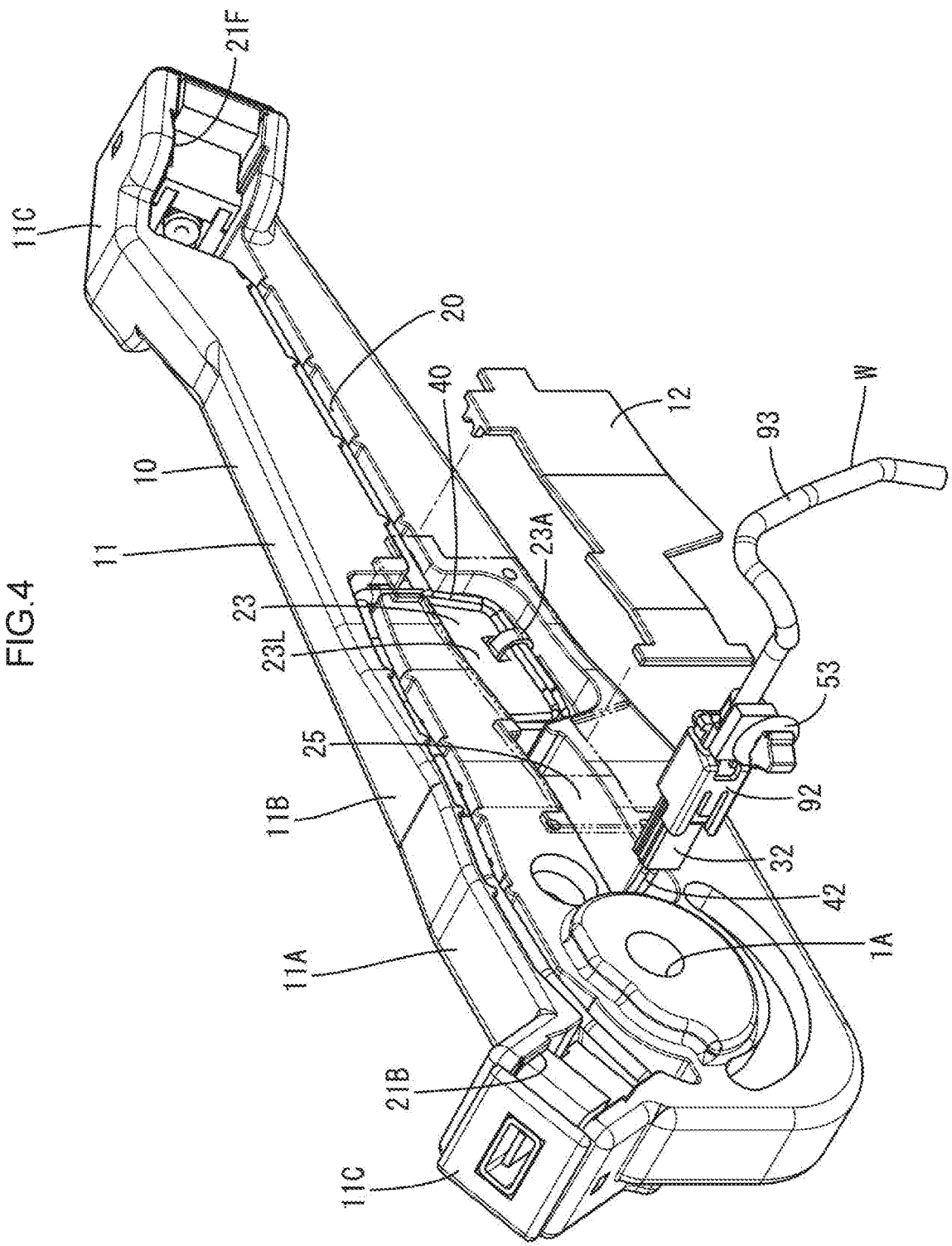
FIG. 4 is an exploded perspective view illustrating the armrest before an extra length portion is arranged inside the frame seen from a rear side.

In the present embodiment, as illustrated in FIG. 4, the frame 10, which is the most inner component of the armrest, includes a routing section 20 in which the cable 40 is arranged. In producing the body member 1, the cable 40 is previously routed in the routing section 20 and the end of the cable extends outside the body member 1. In such a state, the frame 10 and the cable 40 within the routing section 20 are integrally covered with the skin 70 and the foamed resin section 60. The foamed resin material for the foamed resin section 60 is preferably a soft material in view of protecting the cables from a stress caused by thermal expansion or thermal contraction when a temperature changes in the vehicular built-in environment. Urethane foam, foaming beads, or TIP urethane may be preferably used for such foamed resin material.

As specifically illustrated in FIGS. 2 to 4, the frame 10 includes a frame body section 11 and connector arrangement sections 11C. The frame body section 11 has a plate shape that is slightly smaller than the body member 1 and has a tapered shape. One of the connector arrangement sections 11C protrudes frontward from a front end portion of the frame body section 11 and another one protrudes upward from a rear end portion. About one-third of the frame body section 11 on the rear side is a bearing section 11A that is relatively thick and includes a shaft hole 1A that is through hole. The frame body section 11 includes a tapered section 11B that is continuous from a front edge portion of the bearing section 11A. The tapered section 11B extends frontward while reducing its thickness. The connector arrangement sections 11C include connector arrangement recesses 21F, 21B that open frontward and upward, respectively.

Figure 5:
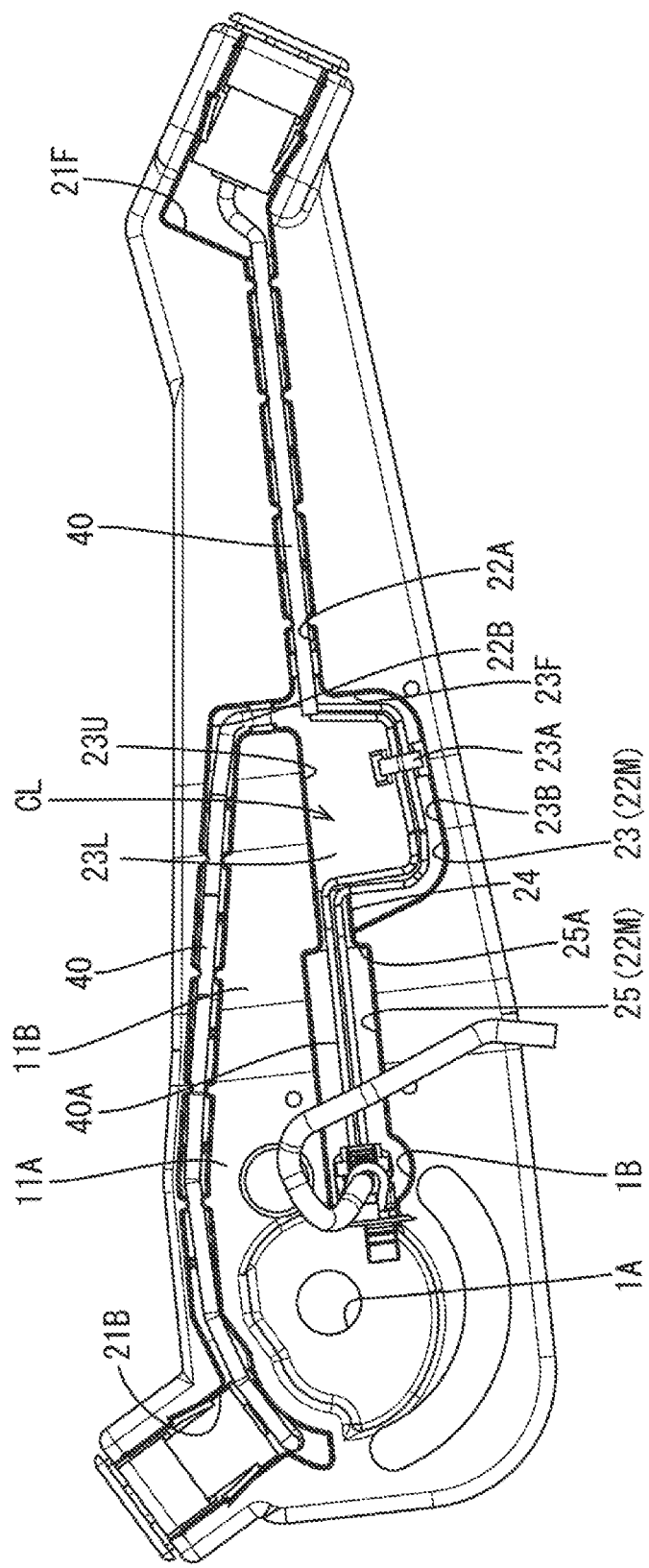
FIG. 5 is an inner surface side view illustrating the armrest before the extra length portion is arranged inside the frame.

As illustrated in FIG. 4, the routing section 20 has a recessed shape such that the inner side surface of the frame body section 11 is recessed toward the outer surface side. As illustrated in FIG. 5, the routing section 20 includes a main section 22M, a first branch section 22A and a second branch section 22B. The main section 22M has a basal end that is on a front side of the shaft hole 1A and extends frontward from the basal end. The main section 22M branches into the first branch section 22A and the second branch section 22B at the front end thereof. The first branch section 22A extends frontward from the front end of the main section 22M and communicates with the connector arrangement recess 21F. The second branch section 22B extends obliquely toward an upper-rear side from the front end of the main section 22M and communicates with the connector arrangement recess 21B. The main section 22M includes the insertion hole 1B at the rear end thereof.

As illustrated in FIG. 5, the cables 40 that are arranged in the first branch section 22A and the second branch section 22B meet together at the front end of the main section 22M and extend rearward in the main section 22M and extend outside through the insertion hole 1B. Hereinafter, as typically illustrated in FIG. 6, before the armrest AR is mounted on the seat 90, a portion of the cable 40 that is arranged inside the body member 1 corresponds to an arranged portion 41 and a portion of the cable 40 that is extending outside from the body member 1 corresponds to an extended portion 42.

As illustrated in FIG. 6, an armrest-side connector 32 is attached to an end of the extended portion 42. The armrest-side connector 32 protrudes outside the body member 1 and can freely change its direction via the extended portion 42. Therefore, an operator changes the direction of the armrest-side connector 32 while seeing it and easily fits the armrest-side connector 32 to the seat-side connector 92 that is connected to the end of the seat-side cable 93. Thus, the connectors are fitted to each other as illustrated in FIG. 6. In the present embodiment, the seat-side connector 92, the armrest-side connector 32, and the extended portion 42 configure a connecting operation section W1 that is used when an operator connects the seat-side cable 93 and the cable 40. The connecting operation section W1 and the seat-side cable 93 of the USB cable W may be referred to as an exposed cable section W2.

In the above configuration in which the extended portion 42 of the cable 40 extends outside the body member 1, the armrest-side connector 32 and the seat-side cable 93 are connected easily. However, when the body member 1 is mounted on the bracket 91 after the connecting operation, the extended portion 42 and the armrest-side connector 32 may be disposed between the body member 1 and the bracket 91 or between the body member 1 and the seat 90 and this may disturb the mounting operation. Further, when the armrest AR that is mounted on the seat 90 is pivotably moved, the extended portion 42 may be caught by other component such as the bracket 91 and disconnected or the cover of the extended portion 42 may be rubbed and worn.

The armrest AR includes a cable storing section 23 in which the extended portion 42 is stored after the electric connecting operation with the seat-side cable 93 is finished.

In the present embodiment, as illustrated in FIGS. 4 and 5, the cable storing section 23 is formed such that a width of the front half portion of the main section 22M is increased in the upper-lower direction. The cable storing section 23 includes an upper wall 23U, a front wall 23F, a bottom wall 23B, and a left wall 23L and defines a space of an inverted trapezoidal shape with a side view. In the cable storing section 23, as illustrated in FIG. 5, a fixing member 23A for fixing the cable 40 protrudes inwardly from a lower edge portion of the left wall 23L.

As illustrated in FIG. 5, the cables 40 extending along the first branch section 22A and the second branch section 22B meet together near the front wall 23F within the cable storing section 23 and extend downwardly along the front wall 23F and further extend rearward along the bottom wall 23B while being fixed by the fixing member 23A and extend upwardly. Accordingly, when the extended portion 42 is not stored within the body member 1, a space CL that can store the cables 40 is provided.

The rear half portion of the main section 22M is a connector arrangement section 25 that has an increased width according to the shape of the seat-side connector 92 and the armrest-side connector 32 that are fitted to each other.

The connector arrangement section 25 includes a pressing restriction portion 25A on a front end portion thereof and the pressing restriction portion 25A is opposite the front end of the armrest-side connector 32. The pressing restriction portion 25A closes the front end of the connector arrangement section 25 while leaving a hole through which the two cables 40 can be inserted. The cable storing section 23 includes a cable end protection portion 24 therein. The cable end protection portion 24 extends continuously from the pressing restriction portion 25A and protrudes frontward. The cable end protection portion 24 is continuous from the left wall 23L and protrudes inwardly (a front side on the sheet in FIG. 5) to form a plate shape.

Figure 7:
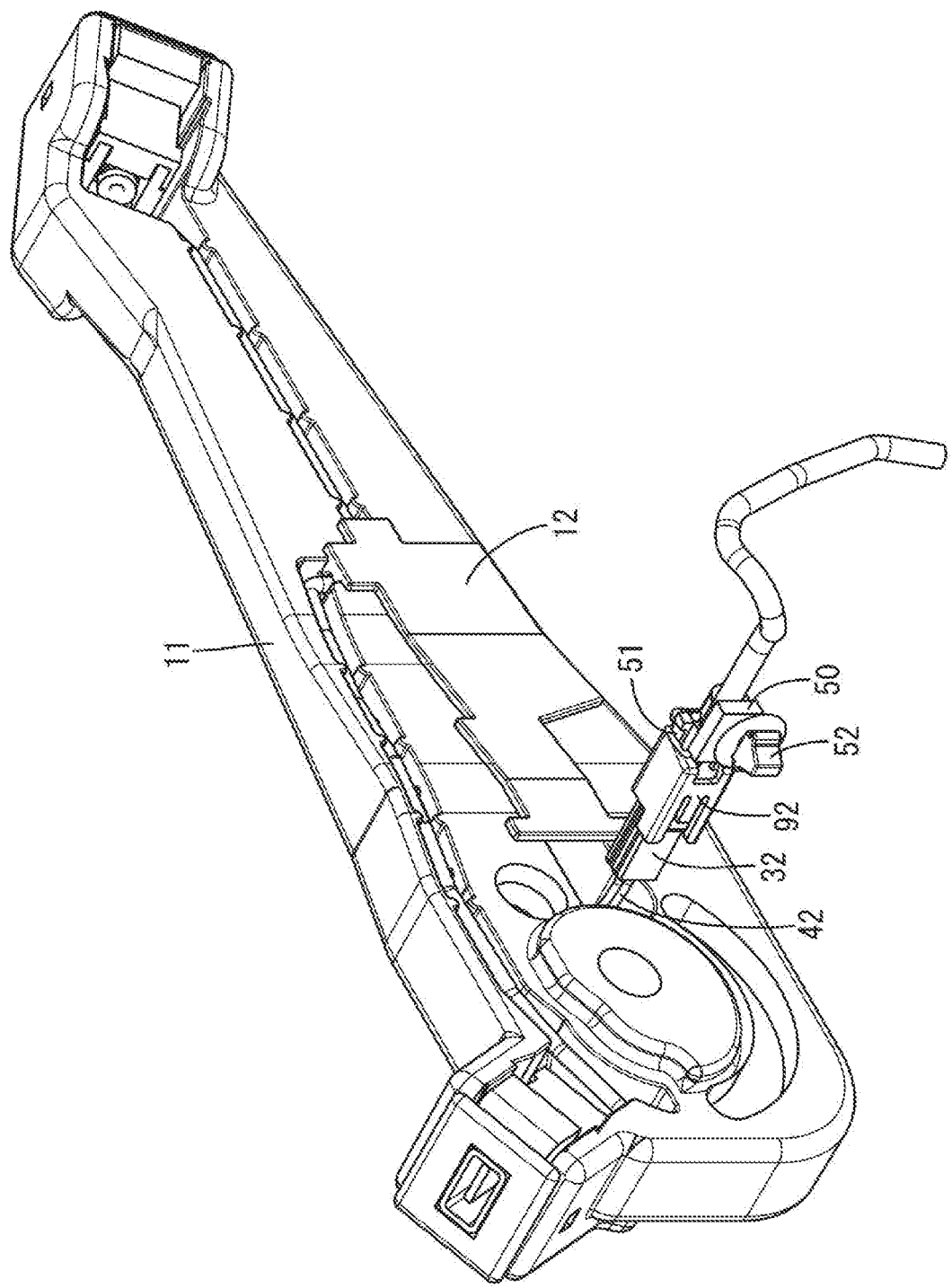
FIG. 7 is a perspective view illustrating the armrest wherein a cover member is mounted on the frame body section.

As illustrated in FIGS. 4 and 7, the cable storing section 23 and the connector arrangement section 25 are covered with a cover member 12 from the right side. The cover member 12 is a separate component. Accordingly, when the filling material is supplied to a space outside the frame 10 to form the foamed resin section 60, the filling material is less likely to flow into the cable storing section 23 and the connector arrangement section 25 and the inner spaces of the cable storing section 23 and the connector arrangement section 25 can be ensured.

As illustrated in FIG. 5, when connecting the seat-side cable 93 and the cable 40, the cable 40 extends from the front end of the main section 22M and extends in the cable storing section 23 and the connector arrangement section 25 to the insertion hole 1B. The cable 40 extends outside the body member 1 through the insertion hole 1B.

As illustrated in FIG. 7, the seat-side cable 93 is attached to a fixing member 50. The fixing member 50 includes a mount portion 51 and a stopper portion 52. The seat-side cable 93 can be inserted through the mount portion 51. The stopper portion 52 extends from the mount portion 51 in a direction perpendicular to the seat-side cable 93. The fixing member 50 includes the mount portion 51 near the seat-side connector 92 of the connecting operation section W1 so as to be fixed to the seat-side cable 93.

Figure 8:
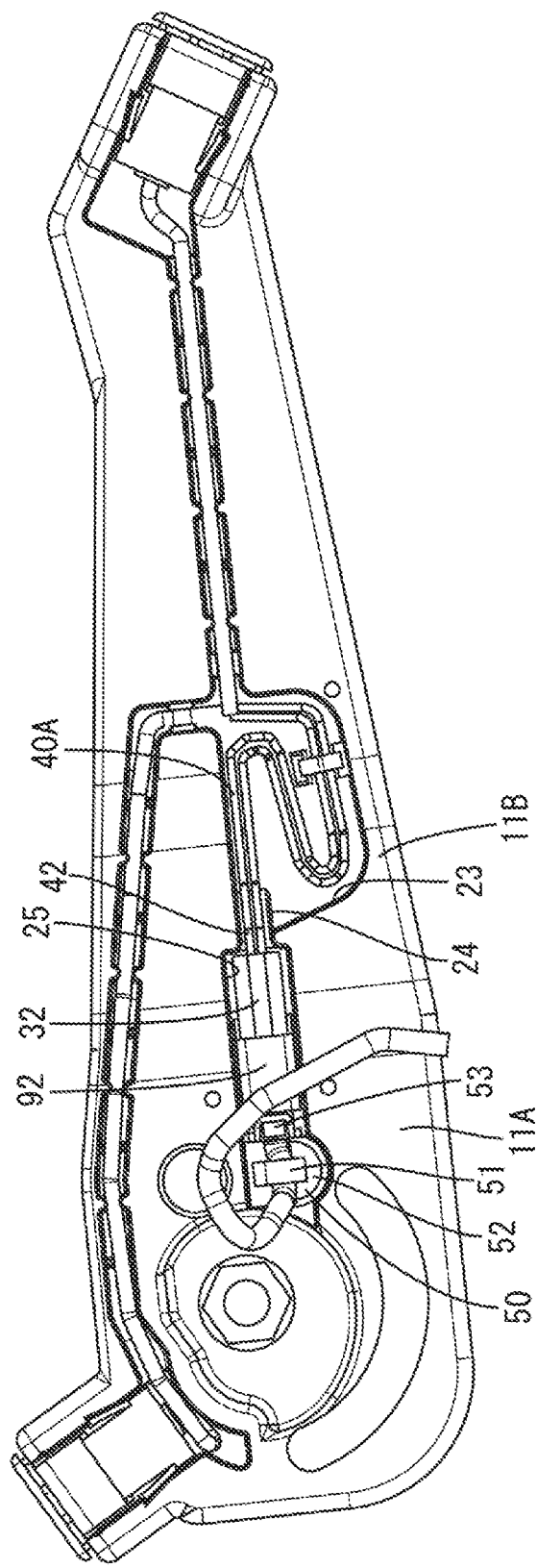
FIG. 8 is an inner surface side view illustrating the armrest wherein the extra length section is arranged in the frame.

After the armrest-side connector 32 and the seat-side connector 92 are fitted to each other in the axial direction and the connection with the seat-side cable 93 is completed, the body member 1 is mounted on the seat 90 as illustrated in FIGS. 1 to 3. When the body member 1 is mounted on the seat 90, the stopper portion 52 of the fixing member 50 is fitted in the insertion hole 1B and the seat-side connector 92 and the armrest-side connector 32 that are fitted to each other are arranged in the connector arrangement section 25 as illustrated in FIG. 8. The extended portion 42 is stored in the cable storing section 23 and arranged between the cable end protection portion 24 and the upper wall 23U. In the present embodiment, the connecting operation section W1 (the seat-side connector 92, the armrest-side connector 32, and the extended portion 42) is arranged in the connector arrangement section 25 and the cable storing section 23.

As illustrated in FIG. 5, in connecting the seat-side cable 93 and the cable 40, a portion of the cable 40 arranged in the connector arrangement section 25 and the cable storing section 23 having a length corresponding to the connecting operation section W1 is an extra length (hereinafter, referred to as an extra length portion 40A). As illustrated in FIG. 8, the extra length portion 40A (having a length corresponding to the connecting operation section W1) is stored in the cable storing section 23 while being bent when the connecting operation section W1 is arranged in the connector arrangement section 25 and the cable storing section 23.

About three-fourths of the cable storing section 23 on the rear side and the whole of the connector arrangement section 25 are included in the bearing section 11A and the tapered section 11B of the frame body section 11 that are relatively thick. According to such a configuration, the cable storing section 23 and the connector arrangement section 25 have a width that surely receives the connecting operation section W1 and the extra length portion 40A therein.

As described earlier, the armrest AR in the present embodiment includes the cable 40 and the body member 1. The cable 40 is connected to the seat-side cable 93 that is mounted on the seat 90 and the body member 1 is mountable on the seat 90 and includes the routing section 20 in which the cable 40 is routed. The cable 40 includes the arranged portion 41 that is arranged in the routing section 20 and the connecting operation section W1 that is taken out from the routing section 20 when being connected to the seat-side cable 93. The connecting operation section W1 is arranged in the routing section 20, when the body member 1 is mounted on the seat 90.

According to such a configuration, the connecting operation section W1 extending outside the routing section 20 is electrically connected to the seat-side cable 93 and this improves operability. When the body member 1 is mounted on the seat 90, the connecting operation section W1 is arranged in the routing section 20 and can be protected from an external force.

The connecting operation section W1 further includes a connector (the armrest-side connector 32) that is connected to the seat-side cable 93 and the routing section 20 includes the connector arrangement section 25 in which the connector 32 can be arranged when the body member 1 mounted on the seat 90.

According to such a configuration, in the body member 1 that is mounted on the seat 90, the connector 32 is arranged in the connector arrangement section 25 and can be protected from an external force.

The arranged portion 41 includes the extra length portion 40A having a length corresponding to the connecting operation section W1. The routing section 20 further includes the cable storing section 23 in which the extra length portion 40A can be stored when the body member 1 is mounted on the seat 90.

In putting the connecting operation section W1 in the routing section 20, the arranged portion 41 includes the length corresponding to the connecting operation section W1 as the extra length portion 40A and the arranged portion 41 is pushed into the routing section 20 and the connecting operation section W1 may not be stored in the routing section 20. According to the above configuration, the extra length portion 40A is stored in the cable storing section 23 when the connecting operation section W1 is arranged in the routing section 20. Therefore, the extra length portion 40A does not disturb the operation and the connecting operation section W1 can be stored in the routing section 20 smoothly.

The body member 1 includes the insertion hole 1B through which the connecting operation section W1 is inserted and the fixing member 50 that can close the insertion hole 1B when the body member 1 is mounted on the seat 90.

The fixing member 50 includes the mount portion 51 that is fixed to a portion of the exposed cable section W2 closer to the seat 90 with respect to the connecting operation section W1. The exposed cable section W2 includes the connecting operation section W1 and the seat-side cable 93.

According to such a configuration, the fixing member 50 is fixed to the portion of the exposed cable section W2 that is closer to the seat 90 with respect to the connecting operation section W1. Therefore, the length of the connecting operation section W1 that is arranged in the routing section 20 can be changed by changing the portion to which the fixing member 50 is fixed.

Other Embodiments

The technology disclosed herein is not limited to the embodiment described above and illustrated in the drawings. For example, the following embodiments will be included in the technical scope of the technology.

(1) In the above embodiment, the cable storing section 23 is disposed next to the connector arrangement section 25 and the extended portion 42 of the cable 40 is arranged in the cable storing section 23. However, the arrangement of the cable storing section 23 is not limited to the above configuration. For example, a connection section may be provided between the cable storing section and the connector arrangement section such that the extended portion is arranged in the connection section and the portion of the arranged portion continuous to the extended portion is arranged in the cable storing section. In short, the cable storing section may have any configuration if the portion of the arranged portion corresponding to the length of the connecting operation section (the extra length portion) can be arranged in the cable storing section.

(2) In the above embodiment, in addition to the extended portion 42, the armrest-side connector 32 and the seat-side connector 92 are arranged in the body member 1. However, the connector arrangement section may not be included in the body member and the armrest-side connector and the seat-side connector may not be arranged in the body member.

(3) In the above embodiment, the cable storing section 23 is formed by increasing a width of a portion of the main section 22M to have an inverted trapezoidal shape. However, the portion in which the cable storing section 23 is included and the shape of the cable storing section 23 are not limited to the above one. For example, the whole main section may have an increased width to be the cable storing section and the cable may wind in the whole main section such that the extra length portion can be arranged in the cable storing section.

EXPLANATION OF SYMBOLS

AR: armrest
1: body member
1B: insertion hole
20: routing section
23: cable storing section
25: connector arrangement section
32: armrest-side connector (connector)
40: cable
40A: extra length portion
41: arranged portion
42: extended portion
50: fixing member
51: mount portion
90: seat
92: seat-side connector (connector)
93: seat-side cable
W1: connecting operation section

What is claimed is:

1. An armrest comprising:
a cable to be connected to a seat-side cable arranged on a seat; and
a body member that is mountable on the seat and includes a routing section therein in which the cable is arranged, wherein
the cable includes an arranged portion that is arranged in the routing section and a connecting operation section that extends outside the routing section when being connected to the seat-side cable,
the connecting operation section is arranged in the routing section when the body member is mounted on the seat,
the arranged portion includes an extra length portion having a length corresponding to the connecting operation section, and
the routing section includes a cable storing section in which the extra length portion is arranged when the body member is mounted on the seat.

2. An armrest comprising:
a cable to be connected to a seat-side cable arranged on a seat; and
a body member that is mountable on the seat and includes a routing section therein in which the cable is arranged, wherein
the cable includes an arranged portion that is arranged in the routing section and a connecting operation section that extends outside the routing section when being connected to the seat-side cable,
the connecting operation section is arranged in the routing section when the body member is mounted on the seat, the body member includes an insertion hole through which the connecting operation section is inserted and a fixing member that can close the insertion hole when the body member is mounted on the seat, and the fixing member includes a mount portion that is fixed to a portion of an exposed cable section including the connecting operation section and the seat-side cable, and the portion is closer to the seat than the connecting operation section is.

3. An armrest comprising:

a cable to be connected to a seat-side cable arranged on a seat; and a body member that is mountable on the seat and includes a routing section therein in which the cable is arranged, wherein the cable includes an arranged portion that is arranged in the routing section and a connecting operation section that extends outside the routing section when being connected to the seat-side cable, the connecting operation section is arranged in the routing section when the body member is mounted on the seat, the connecting operation section further includes a connector to be connected to the seat-side cable, the routing section includes a connector arrangement section in which the connector can be arranged when the body member is mounted on the seat, the body member includes an insertion hole through which the connecting operation section is inserted and a fixing member that can close the insertion hole when the body member is mounted on the seat, and the fixing member includes a mount portion that is fixed to a portion of an exposed cable section including the connecting operation section and the seat-side cable, and the portion is closer to the seat than the connecting operation section is.

4. The armrest according to claim 1, wherein the body member includes an insertion hole through which the connecting operation section is inserted and a fixing member that can close the insertion hole when the body member is mounted on the seat, and the fixing member includes a mount portion that is fixed to a portion of an exposed cable section including the connecting operation section and the seat-side cable, and the portion is closer to the seat than the connecting operation section is.

5. The armrest according to claim 1, wherein the connecting operation section further includes a connector to be connected to the seat-side cable, and the routing section includes a connector arrangement section in which the connector can be arranged when the body member is mounted on the seat.

6. The armrest according to claim 5, wherein the body member includes an insertion hole through which the connecting operation section is inserted and a fixing member that can close the insertion hole when the body member is mounted on the seat, and the fixing member includes a mount portion that is fixed to a portion of an exposed cable section including the connecting operation section and the seat-side cable, and the portion is closer to the seat than the connecting operation section is.

* * * * *